J. OLSON.
HAY PRESS.
APPLICATION FILED DEC. 23, 1909.
1,071,259.
Patented Aug. 26, 1913.
3 SHEETS—SHEET 3.
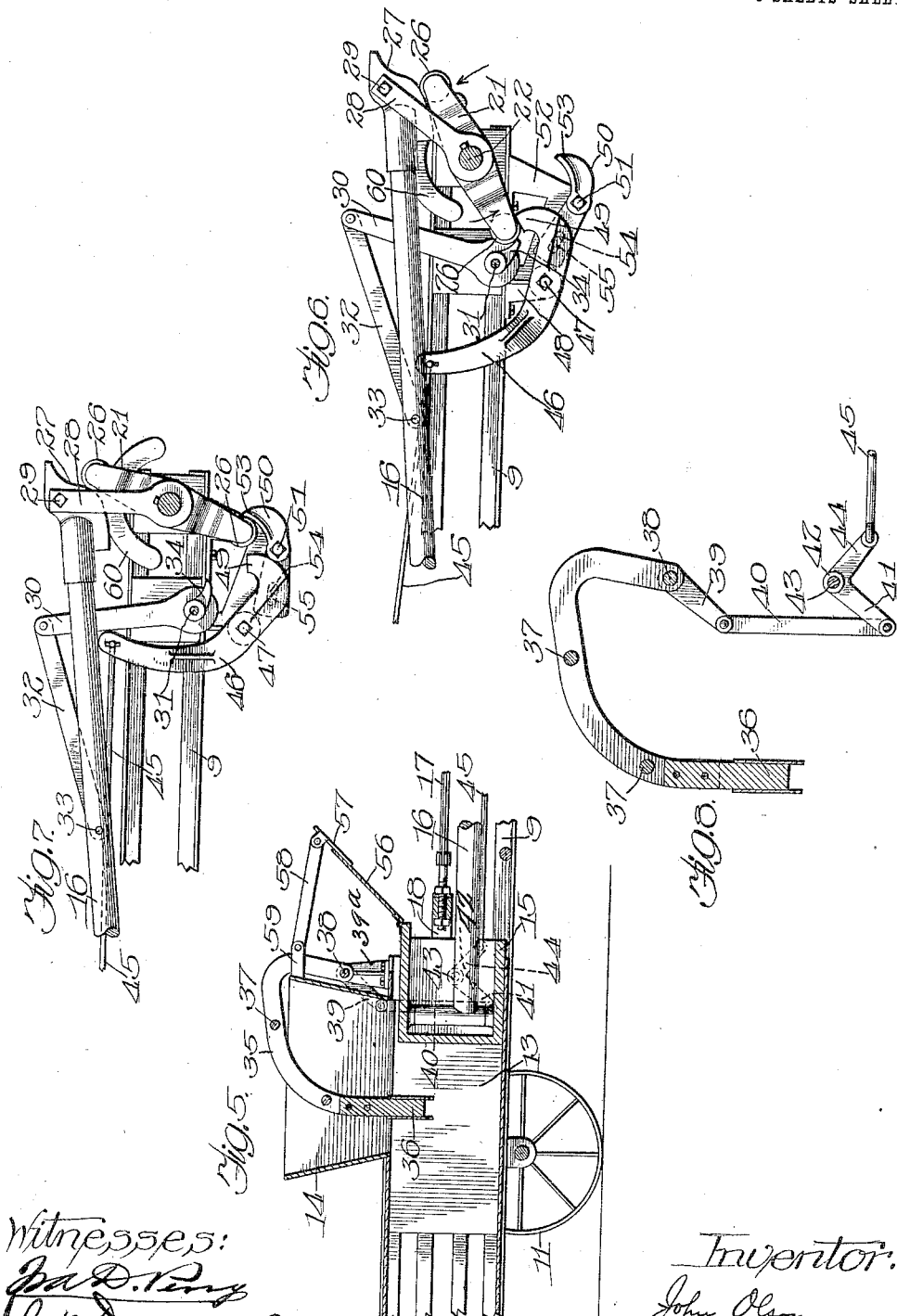
Witnesses:
Inventor:
John Olson,

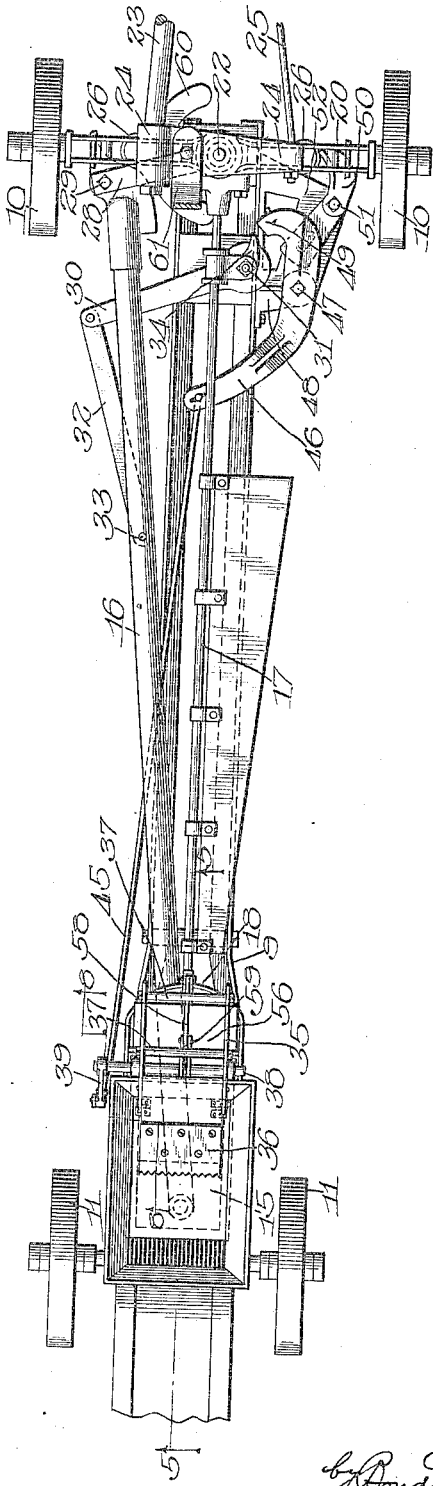

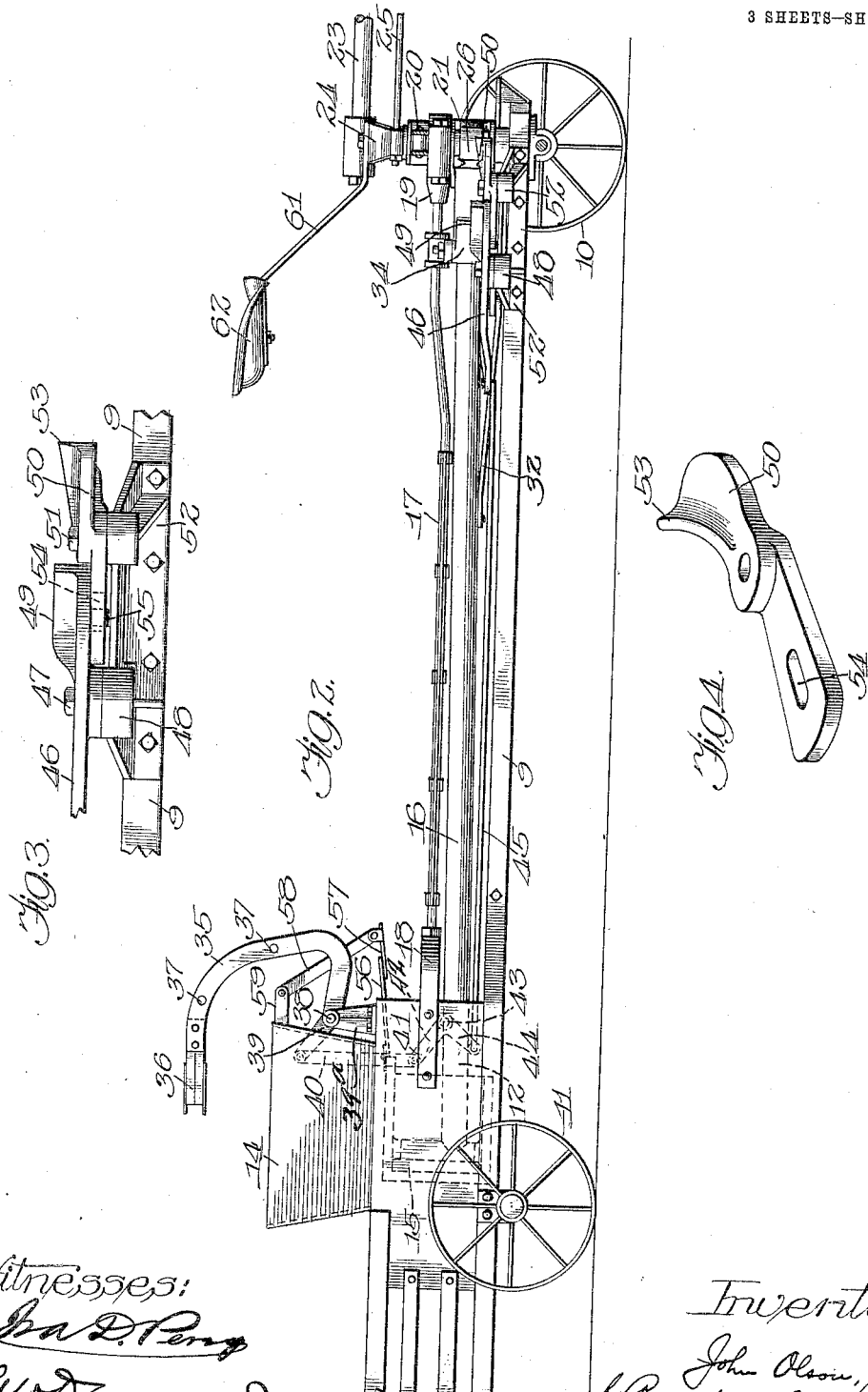

UNITED STATES PATENT OFFICE.

JOHN OLSON, OF BRADLEY, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

HAY-PRESS.

1,071,259.  Specification of Letters Patent.  Patented Aug. 26, 1913.

Application filed December 23, 1909. Serial No. 534,671.

*To all whom it may concern:*

Be it known that I, JOHN OLSON, a citizen of the United States, residing at Bradley, in the county of Kankakee and State of Illinois, have invented certain new and useful Improvements in Hay-Presses, of which the following is a specification, reference being had to the accompanying drawings.

My invention relates to hay presses, and it has for its principal object to provide certain improvements in presses operated by horse-power, such means relating more particularly to the mechanism for feeding the hay to the baling-chamber. I accomplish this object as illustrated in the drawings and as hereinafter described.

What I regard as new is set forth in the claims.

In the accompanying drawings,—Figure 1 is a plan view of my improved press; Fig. 2 is a side elevation thereof; Fig. 3 is an enlarged detail, being a side elevation of part of the mechanism by which the feeding mechanism is operated; Fig. 4 is a perspective view of part of the mechanism shown in Fig. 3; Fig. 5 is a longitudinal vertical section through the baling-case and adjacent parts; Figs. 6 and 7 are plan views of part of the mechanism for operating the plunger and feeding devices; and Fig. 8 is a detail, being a vertical section on line 8—8 of Fig. 1 showing the feeding or beater-arm and connected parts.

Referring to the drawings,—9 indicates the frame of the machine, which is mounted on front and rear wheels 10—11, respectively, and at its rear end carries the usual baling-case 12. Said case contains a baling-chamber 13, the hay being introduced thereinto through a hopper 14 overlying said baling-chamber, as shown in Fig. 5.

15 indicates a plunger which is adapted to reciprocate in the frame, moving back and forth in the baling-chamber so as to compress the hay therein in the usual way.

16 indicates the plunger-rod by which the plunger is reciprocated.

17 indicates a brace-rod, the rear end of which is connected to the baling-case preferably by a stirrup 18, its front end being connected to a suitable bracket 19 connected in any suitable way with the front axle 20.

21 indicates a cross-head mounted upon and keyed to a central pivot 22 at the front of the frame 9, said pivot coinciding with the pivotal center of the front axle 20, said pivot also forming the pivot-bolt for the front axle 20.

23 indicates a sweep-lever of the usual type connected at its rear end with a bracket 24 mounted upon and keyed to the pivot-bolt 22, and 25 indicates a brace for the outer end of said lever, said brace being connected at its rear end with the bracket 24 at the opposite side of the pivot 22. The arrangement is such that as the team swings the sweep-lever 23 around the pivot 22 the cross-head 21 is correspondingly rotated about said pivot.

As best shown in Figs. 6 and 7, the cross-head 21 is provided with anti-friction rollers 26 at its ends, and said rollers are adapted to engage a casting 27 provided at the forward end of the plunger-rod 16 during the operative stroke of said plunger-rod. 28 indicates a link which operates to hold the forward end of the plunger-rod in position to be operated upon by one arm or the other of the cross-head, said link being pivotally connected at its outer end by a pivot 29 with the casting 27, and being journaled at its inner end upon the pivot-bolt 22. When the plunger-rod is in its retracted position, as shown in Fig. 6, the casting 27 is in position to be engaged by one of the rollers 26 of the cross-head and is held in position to be so operated upon by the link 28.

Assuming the parts to be in the position shown in Fig. 6, when the cross-head 21 rotates in the direction indicated by the arrow in said figure the roller 26 which is in engagement with said casting operates to move the plunger-rod endwise toward the baling-case, moving out of engagement with the casting 27 as the operation continues, as shown in Fig. 7. As the plunger-rod moves longitudinally as described, after passing the point shown in Fig. 7 it swings gradually into alinement with the frame of the machine and with the cross-head 21 so that the greatest power is applied to the plunger-rod toward the end of its stroke, which is the time of greatest compression. As soon as the plunger reaches the point of greatest compression, the cross-head 21 disengages the casting 27 and the plunger rebounds, but in order to insure the return of the plunger to the limit of its forward movement a rocking-arm 30 is provided which is pivoted at 31 upon the frame 9 adjacent to the path of the rollers 26, the outer end of said arm being connected by a link 32 with the inner portion of the plunger-rod 16, as shown at 33 in Figs. 6 and 7. The inner end of the arm 30 carries a finger 34 which lies in the path of the rollers 26, except when the plunger-rod is at its extreme forward position. Consequently, after one or the other of the rollers 26 disengages the casting 27, it moves into engagement with the finger 34, and as it continues to travel operates through said finger to rock the arm 30 to the right, as shown in Fig. 6, and thereby carry the plunger-rod 16 forward to the limit of its movement in that direction. Thus I provide a positive return movement for the plunger as well as a positive compressing movement.

The hay is fed into the baling-chamber from the hopper 14 by means of a rocking beater-arm 35 having a head 36 which swings down through the hopper into the baling-chamber, as shown in Fig. 5. The beater-arm 35, which is preferably composed of two members spaced apart and held by cross-bolts 37, is pivotally mounted at its forward end upon a shaft 38 which is supported by brackets 39ª mounted on the baling-case in front of the hopper 14, as best shown in Fig. 5,—the members of the beater-arm being suitably shaped so that as the beater-arm is swung about the shaft 38 the beater-head is moved up and down through the hopper into and out of the baling-chamber. The shaft 38 is rocked to operate the beater-arm by means of a crank-arm 39 secured to said shaft and projecting downwardly and rearwardly therefrom, said crank being connected by a link 40 to one arm 41 of a bell-crank lever 42 mounted on a pivot 43 at one side of the baling-case, as shown in Figs. 5 and 8. The other arm 44 of said bell-crank lever is connected by a connecting-rod 45 with a rocking-lever 46 mounted at the front of the frame 9 on a pivot 47 supported by a bracket 48, as best shown in Figs. 6 and 7. The pivot 47 is placed between the ends of the lever 46, the rear end of said lever being provided with a curved projection 49 which, when the lever 46 is in the position shown in Fig. 6, lies in the path of the rollers 26, being adjacent to the finger 34. It will be noted that when the parts are in the position shown in Fig. 6 the connecting-rod 45 is more nearly parallel with the lever 46, and consequently the connecting-rod 45 is in its rearmost position. At this time the arm 44 of the bell-crank lever is in a substantially vertical position and the arm 41 in a horizontal position, thus lifting the arm 39 and holding the beater-arm in its uppermost or inoperative position,— the beater-head 36 being then above the hopper 14. By rocking the lever 46 to the position shown in Fig. 7 the connecting-rod 45 will be drawn forward, thereby moving the bell-crank lever 42 to the position shown in Figs. 5 and 8, and moving the beater-head down into the baling-chamber, as shown in said figures. This operation necessarily takes place while the plunger is retracted, and to secure the proper timing of the operations of the plunger and beater-arm the projection 49 of the lever 46 is arranged to be engaged by the rollers 26 as soon as they operate through the finger 34 to move the plunger-rod forward to the limit of its movement in the manner described. This is clearly shown in Fig. 6, from which it will be seen that the roller 26 engages the projection 49 as it moves out of engagement with the finger 34. When the parts are in the position shown in Fig. 6, as the cross-head 21 continues to rotate the roller 26 in engagement with the projection 49 will operate to move outward the forward end of the lever 46, rocking the same about its pivot 47 and pulling back on the connecting-rod 45, with the result of moving the beater-head down into the hopper and baling-chamber in the manner above described.

In order to restore the beater-arm and head to their uppermost or inoperative position, a lever 50 is provided which is pivotally mounted at 51 upon a bracket 52 secured at one side of the frame 9, as shown in Fig. 6. The forward end of the lever 50 is curved, as shown at 53 in Figs. 4, 6 and 7, its rear end being provided with a slot 54 which receives a pin 55 carried by the forward end of the lever 46. When the parts are in the position shown in Fig. 7, the forward end of the lever 50 lies in the path of the rollers 26, the arrangement being such that immediately after either of the rollers 26 disengages the lever 46 it comes into engagement with the lever 50, pressing the forward end of said lever outward and moving its rear end inward, thus swinging the forward end of the lever 46 inward and moving said lever more nearly into alinement with the connecting-rod 45. From the foregoing description it will be seen that such rocking of the lever 46 rocks the bell-crank lever 42 to swing the crank 39 upward, consequently moving the beater-arm and head up out of operative position. The operation of moving the beater-head out of operative position is assisted by the action of the arm 30 upon the rear or inner end of the lever 46. As best shown in Fig. 7, when the plunger has been moved part way back on its compressing stroke the arm 30 comes in contact with the inner end of the lever 46, which lies in its path, and as the plunger continues its movement said arm carries the inner end of the lever 46 back, thereby continuing the rocking movement initiated by the action of the lever 50 upon the lever 46. The arrangement is such that when the roller 26 passes out of engagement with the lever 50 the arm 30 continues to press backward the inner end of the lever 46, thus giving a more positive and continuous application of power to restore the beater-head to its inoperative position.

In order to close the bottom of the hopper when the plunger is in the baling-chamber and thereby permit a fresh charge of hay to be placed in the hopper without waiting until the plunger is withdrawn, the plunger 15 is provided on its upper side with a hinged-plate 56, which extends forwardly therefrom, forming an extension of the upper surface of the plunger, its outer edge being supported by an arm 57 carried by a swinging link 58, the rear end of which is pivoted to a bracket 59 which projects forwardly from the front side of the hopper 14. By this construction when the plunger advances the plate 56 swings down into the same plane as the upper surface of the plunger and forms an extension thereof which closes the bottom of the hopper during the compression stroke and thereby enables the operator to place a fresh charge of hay in the hopper without waiting until the plunger is withdrawn. Upon the withdrawal of the plunger the plate 56 swings up out of the way, as shown in the drawings.

By the construction described the feeding mechanism is not operated to carry the hay down into the baling-chamber until after the plunger has been carried forward to the limit of its movement in that direction, thus giving ample time for the placing of a fresh charge of hay in the hopper, and when the feeding mechanism is operated it is quickly moved out of operative position so as not to interfere with the operation of the plunger on its compression stroke. The return movement of the feeding mechanism is much quicker than its downward movement, so that more time is allowed for placing a fresh charge of hay in the hopper.

60 indicates a segmental guide for the cross-head 21, and 61 indicates a support for the usual driver's seat 62.

That which I claim as my invention, and desire to secure by Letters Patent, is,—

1. In a hay-press, the combination of a frame, a baling-chamber, a plunger adapted to reciprocate therein, a cross-head for actuating said plunger, means for feeding the hay to the baling chamber, and a plurality of separately pivoted levers operatively connected with said feeding means and actuated successively by said cross-head for moving said feeding means into and out of operative position respectively.

2. In a hay-press, the combination of a frame, a baling-chamber, a plunger adapted to reciprocate therein, a plunger-rod for operating said plunger, means for actuating said plunger-rod, a beater-head for feeding the hay to the baling-chamber, a rocking-lever connected with said beater-head for operating the same, and means connected with the plunger and engaging said rocking-lever upon the compressing stroke of the plunger for moving said beater-head out of operative position.

3. In a hay-press, the combination of a frame, a baling-chamber, a plunger adapted to reciprocate therein, a plunger-rod for operating said plunger, means for actuating said plunger-rod, a beater-head for feeding the hay to the baling-chamber, a rocking-lever connected with said beater-head for operating the same, and a rocking-arm connected with the plunger and engaging said rocking-lever upon the compressing stroke of the plunger for moving said beater-head out of operative position.

4. In a hay-press, the combination of a frame, a baling-chamber, a plunger adapted to reciprocate therein, a cross-head for actuating said plunger, means for feeding the hay to the baling-chamber, and means connected with the plunger and operating on the compression stroke thereof to move said feeding means out of operative position.

5. In a hay-press, the combination of a frame, a baling-chamber, a plunger adapted to reciprocate therein, a cross-head for actuating said plunger, means for feeding the hay to the baling-chamber, means connected with the plunger and operating on the compression stroke thereof to move said feeding means out of operative position, and separate means operated by the cross-head for assisting in moving said feeding means out of operative position.

6. In a hay-press, the combination of a frame, a baling-chamber, a plunger adapted to reciprocate therein, a cross-head for actuating said plunger, means for feeding the hay to the baling-chamber, means connected with the plunger and operating on the compression stroke thereof to move said feeding means out of operative position, and a separate lever operated by the cross-head for assisting in moving said feeding means out of operative position.

7. In a hay-press, the combination of a frame, a baling-chamber, a plunger adapted to reciprocate therein, a plunger-rod for operating said plunger, means for actuating said plunger-rod, a rocking arm, a link connecting said arm with said plunger-rod, said plunger-rod actuating means being adapted to act upon said rocking arm to retract the plunger, means for feeding the hay to the baling-chamber, a lever adapted to be actuated by said plunger-rod operating means to feed the hay to the baling-chamber and actuated by said rocking arm to move the feeding means out of operative position and means independent of the plunger connecting said lever to the feeding means.

8. In a hay-press, the combination of a frame, a baling-chamber, a plunger adapted to reciprocate therein, a plunger-rod for operating said plunger, means for actuating said plunger-rod to compress the hay in the baling-chamber, means for feeding the hay to the baling-chamber, a rocking lever connected with said feeding means for actuating the same, and a second lever adapted to operate on said first-mentioned lever to actuate the same to move the feeding means out of operative position, said plunger-rod operating means being adapted to operate said levers successively.

9. In a hay-press, the combination of a frame, a baling-chamber, a plunger adapted to reciprocate therein, a plunger-rod operating said plunger, means for operating said plunger-rod to compress the hay, means for feeding the hay to the baling-chamber, a lever connected with said feeding means for actuating the same, means connected with the plunger-rod and operating on the compression stroke thereof to move said lever to carry the feeding means out of operative position, and a second lever operatively engaging said first-mentioned lever and actuated by said plunger-rod operating means for assisting in actuating said first-mentioned lever to move the feeding means out of operative position.

10. In a hay-press, the combination of a frame, a baling-chamber, a hopper above said baling-chamber and communicating therewith, a rock-shaft mounted adjacent to said baling-chamber, a beater-arm mounted on said rock-shaft and having a head adapted to feed the hay from said hopper into said baling-chamber, a plunger adapted to reciprocate in said baling-chamber, a plunger-rod, a cross-head for reciprocating said plunger-rod, a rocking-lever mounted adjacent to said cross-head and connected with said rock-shaft whereby by rocking said lever said rock-shaft may be rocked, said lever being arranged to be operated by said cross-head after the plunger is retracted, and a pivoted lever connected with said lever and adapted to be actuated by said cross-head for restoring said lever to its former position after it has been actuated by the cross-head.

JOHN OLSON.

Witnesses:
 John McCarthy,
 C. A. Voorhees.

---

Copies of this patent may be obtained for five cents each, by addressing the "Commissioner of Patents, Washington, D. C."